(12) United States Patent
Kilburn

(10) Patent No.: US 6,759,627 B2
(45) Date of Patent: Jul. 6, 2004

(54) METHOD AND APPARATUS FOR CLEANING GENERATOR AND TURBINE COMPONENTS

(76) Inventor: Chris A. Kilburn, 129 Goossen Regan Rd., Buskirk, NY (US) 12028

( * ) Notice: Subject to any disclaimer, the term of this patent is extended or adjusted under 35 U.S.C. 154(b) by 0 days.

(21) Appl. No.: 10/273,043

(22) Filed: Oct. 17, 2002

(65) Prior Publication Data

US 2004/0074883 A1 Apr. 22, 2004

(51) Int. Cl.[7] .................. B23K 26/00; B23K 26/14; B23K 26/16; B23K 26/18
(52) U.S. Cl. .................. 219/121.69; 219/121.68; 219/121.85
(58) Field of Search .................. 219/121.69, 121.67, 219/121.68, 121.85, 121.6

(56) References Cited

U.S. PATENT DOCUMENTS

| 5,189,915 A | | 3/1993 | Reinhart et al. | |
|---|---|---|---|---|
| 5,643,476 A | | 7/1997 | Garmire et al. | |
| 5,736,709 A | * | 4/1998 | Neiheisel | 219/121.61 |
| 5,780,806 A | * | 7/1998 | Ferguson et al. | 219/121.68 |
| 6,288,362 B1 | | 9/2001 | Thomas et al. | |
| 6,369,353 B1 | * | 4/2002 | Soska | 219/121.68 |

OTHER PUBLICATIONS

Liu, K. and Garmire, E., "Paint removal using lasers," Applied Optics, vol. 34, No. 21, Jul. 20, 1995, pp. 4409–4415.

* cited by examiner

*Primary Examiner*—M. Alexandra Elve
(74) *Attorney, Agent, or Firm*—Hoffman, Warnick & D'Alessandro LLC; Michael F. Hoffman, Esq.

(57) ABSTRACT

A laser-based cleaning system for cleaning generator and turbine parts. In one aspect, the invention includes a system for cleaning blades of a turbine rotor assembly, comprising: a laser positioned remotely from the turbine rotor assembly for generating a laser signal; a laser workhead that receives the laser signal via an optical fiber, wherein the laser workhead is positionable proximate a blade in the turbine rotor assembly and can deliver a laser beam onto a surface of the blade to cause a cleaning of the blade; and a vacuum system for vacuuming debris created by the cleaning.

33 Claims, 5 Drawing Sheets

METHOD AND APPARATUS FOR CLEANING GENERATOR AND TURBINE COMPONENTS

BACKGROUND OF THE INVENTION

1. Technical Field

Figure 1:
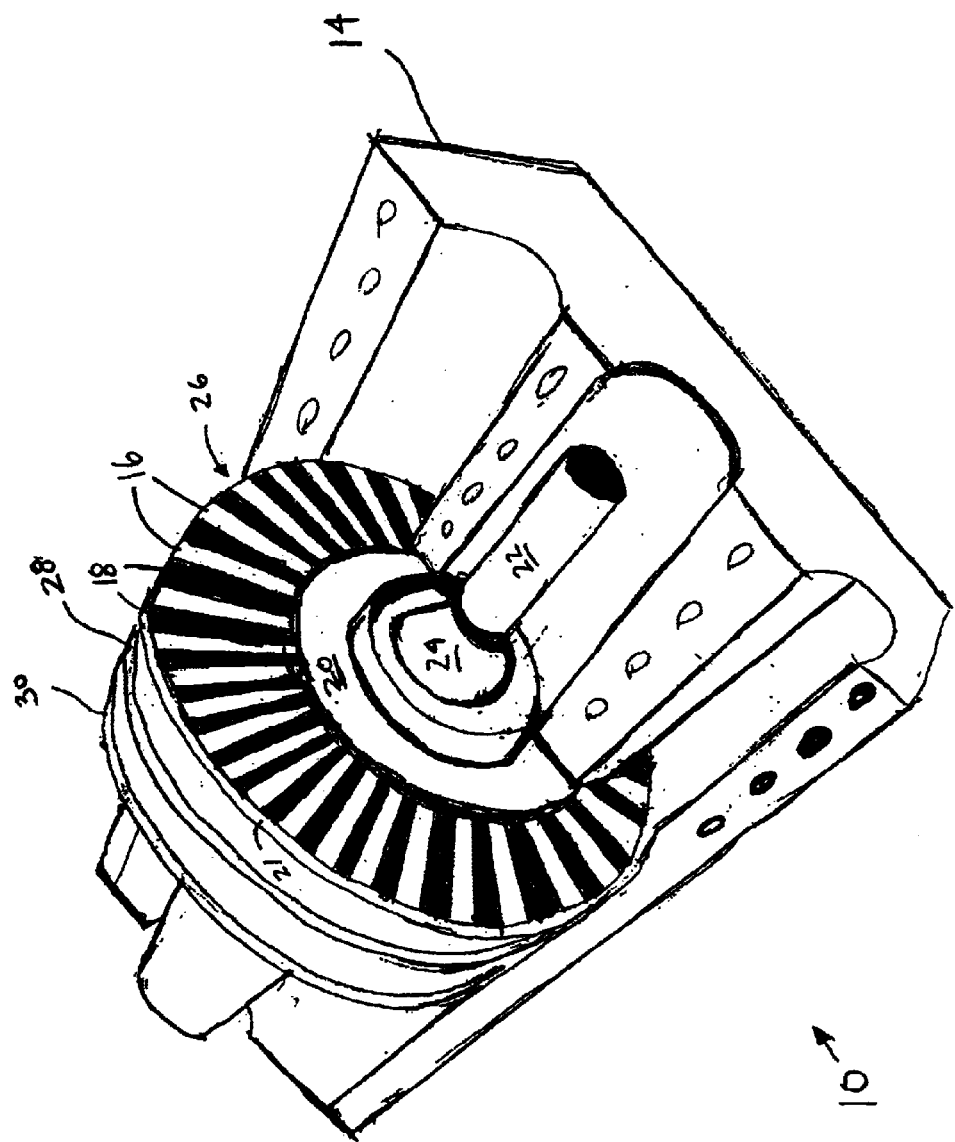

The present invention relates to cleaning systems, and more particularly relates to a laser based ablation method for cleaning generator and turbine components.

2. Related Art

Maintaining and cleaning large-scale turbine and generator components (referred to collectively as "power generation components") such as those found in power generation plants, represent a significant operational cost. The combination of intense stresses placed on the components and contaminations introduced into the components requires that such large-scale systems follow a strict maintenance schedule. Unfortunately, this results in these machines being taken "off-line" for a period of time for servicing. Every hour of downtime results in significant lost revenue, particularly in power generation plants and the like. Accordingly, the need for quick and efficient cleaning techniques for turbine and generator components remains an ongoing challenge.

Cleaning generator or turbine components may for instance require a complete disassembly, e.g., removal of the turbine from its housing, removal of the rotating field from the stator core, etc. The process of completely disassembling such a machine is a complex and expensive process. In the past, effectively cleaning certain components without a complete disassembly was almost impossible given that a foreign material (e.g., blast media) would need to be introduced, therefore potentially contaminating other parts of the machine.

Exemplary components requiring cleaning include turbine blades, the generator stator core, rotating field coils, rotor forging, retaining rings, etc. Cleaning involves removing dust, oily deposits, combustion deposits and other surface contamination. For example, turbine parts, such as turbines blades may require the removal of built up debris that is reducing the overall efficiency of the machine. Past methods for cleaning such parts typically included a high-pressure application of aluminum oxide, glass bead, or $CO_2$.

Cleaning generator parts often involves removal of residual insulation and resins from the coil slots in the rotor forging and stator core when the windings are removed for a rewind. The current methods of cleaning such components are essentially manual, e.g., using scrapers made of TEXTOLITE™, wiping with rags soaked in approved cleaning solutions, and polishing with a clean dry rag. Likewise, if the rotor coils are to be reused, removal of insulation and resins from the coils is also required. Rotor forging and rotor coils to be reused are often cleaned by blasting with glass beads. Rotor coils wrapped with glass mica tape can also be cleaned by heating in an oven to burn off the tape and subsequently cleaned with approved solvents and rags.

The above-described methods are not only labor intensive, but also pose an environmental hazard. For example, the process of removing and disposing of the used glass beads and corncob, as well as processes related to collecting and disposing of the contaminated rags after cleaning create environmental waste. Workmen are exposed to hazardous chemical cleaners and are subjected to potential exposure to airborne contamination of the media used for blast cleaning. The blast cleaning media can escape from the enclosure and contaminate the surrounding area. Accordingly, there exists a need to overcome the problems faced by prior approaches.

SUMMARY OF THE INVENTION

The present invention addresses the above-mentioned problems, as well as others, by providing a cleaning system and method that utilizes a portable workhead to direct a pulsed laser beam to a surface of a generator or turbine component. In a first aspect, the invention provides a laser-based cleaning system for cleaning blades of a turbine rotor assembly, comprising: a laser positioned remotely from the turbine rotor assembly for generating a laser signal; a laser workhead that receives the laser signal via an optical fiber, wherein the laser workhead is positionable proximate a blade in the turbine rotor assembly and can deliver a laser beam onto a surface of the blade to cause a cleaning of the blade; and a vacuum system for vacuuming debris created by the cleaning.

In a second aspect, the invention provides a method for laser-based cleaning of blades in a turbine rotor assembly, comprising: positioning a laser remotely from the turbine rotor assembly; mounting a robot proximate the turbine rotor assembly; providing within the robot a laser workhead that receives a laser signal from the laser via an optical fiber; positioning the workhead proximate a first turbine blade such that the workhead can deliver a laser beam onto the surface of the first blade; robotically moving the workhead along the first blade in a preprogrammed manner while the laser beam ablates the surface of first blade to effectuate a cleaning of the first blade; and vacuuming debris caused by the ablation.

In a third aspect, the invention provides a laser-based cleaning system for cleaning a rotor bore within a turbine shaft, comprising: a laser positioned remotely from the turbine shaft for generating a laser signal; a robot capable of traversing the rotor bore and directing a laser workhead at predetermined positions along the rotor bore surface; an optical fiber that delivers a laser signal from the laser to the laser workhead, wherein the laser workhead can deliver a laser beam onto rotor bore surface to cause a cleaning; and a vacuum system for vacuuming debris created by the cleaning.

In a fourth aspect, the invention provides a laser-based cleaning system for cleaning power generation components (turbine, generator, etc.), comprising: a laser workhead that receives the laser signal via an optical fiber, wherein the laser workhead is positionable proximate a component and can deliver a laser beam onto a surface the component to cause a cleaning; a laser positioned remotely from the laser workhead for generating a laser signal over the optical fiber, and a vacuum system for vacuuming debris created by the cleaning.

DETAILED DESCRIPTION OF THE INVENTION

Overview

The present invention provides various laser-based systems for cleaning generator and turbine parts (collectively "power generation components"). As noted above, cleaning such components is critical for maintaining performance, and is also a prerequisite for performing non-destructive evaluations (NDE's). It should be understood that the invention could be applied to any type of mechanical power system that utilizes rotating parts, e.g., gas turbines, steam engines, jet engines, etc., for which cleaning is required.

Turbine Blades

Referring now the drawings, FIG. 1 depicts an exemplary turbine system 10 seated in the bottom portion of a turbine housing 14. The turbine system 10 would typically sit on a turbine deck (not shown). The top portion of the housing (not shown) has been removed to expose the inner workings of the turbine system 10. The depicted turbine comprises a multistage turbine having three turbine units or turbine rotor assemblies 26, 28 and 30 mounted to a hub 24 on a shaft 22. Each assembly 26, 28, 30 comprises a plurality of radial extending blades 16 separated by a spacing 18. Depending on the particular specification, the configuration, spacing, pitch, etc., of the blades will vary. Each blade 16 is attached at a dovetail section 20 to the main shaft 22.

The ability to regularly clean the turbine blades 16 and dovetail section 20 has been shown to greatly improve performance of the turbine. Tests have shown that a 3–5 mil build-up of debris on the turbine blades will reduce the efficiency of the turbine 3–4%. Moreover, cleaning is also required before a non-destructive evaluation (NDE) can be performed (e.g., checking for failures, measuring tolerances, etc.). Prior to this invention, however, cleaning the turbine blades and dovetail section 20 required the entire turbine to be removed from its housing 14 to a clean-room environment, where the parts could be blasted with a foreign media. Such a disassembly resulted in extended downtime for the unit, which significantly drove up the costs of the cleaning process. Moreover, because prior cleaning techniques required the introduction of a blast media, it was not possible to clean the turbine in its housing.

Figure 2:
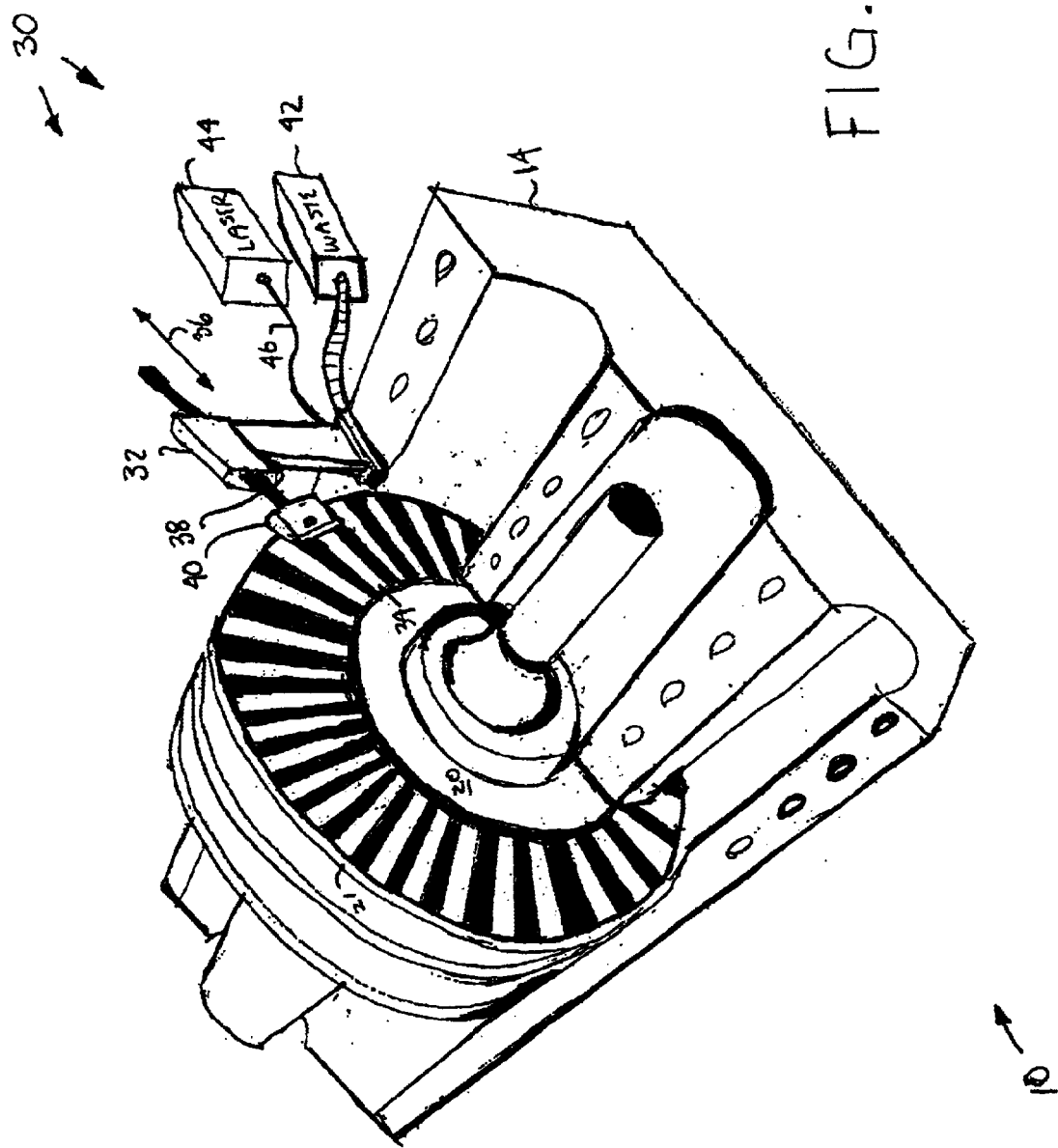

FIG. 2 depicts an embodiment of an exemplary cleaning system 30 for cleaning turbine parts, without the need of removing the turbine from lower housing 14. The cleaning system 30 includes a robot 32 for manipulating a laser workhead (not shown) capable of laser ablating debris from various turbine parts. In this exemplary embodiment, robot 32 comprises an arm 38 that moves a robotic work unit 40 along a turbine blade 34 in a generally radial motion 36. The robotic work unit 40 moves the laser workhead to various positions along the turbine blade using known robotic techniques. The laser workhead delivers a pulsed laser beam onto the surface of the blade using a pre-programmed pattern, ablating the surface and evenly removing built up debris. Any loose debris resulting from the ablation process is removed by a vacuum system, contained in the robotic workhead 40, to a remote waste container 42, thereby avoiding the possibility of contamination in the turbine system 10.

A remotely located laser 44 transmits a laser beam over a fiber optic cable 46 to the laser workhead thereby allowing a relatively small and versatile workhead to be used to remove debris from the turbine blades and related parts. As is described in more detail below, laser 44 may comprise any type of laser system (e.g., a YAG laser or a $CO_2$ laser) capable of delivering a relatively high power laser beam (e.g., 0.5–5 kilowatts) over fiber optics.

In addition, robotic workhead 40 may also include a non-destructive evaluation (NDE) system for examining the turbine component for cracks or other failures after it is cleaned. Known NDE techniques are presently utilized for the inspection of steam and gas turbine blades with an emphasis on detecting minute defects in the blades. High inspection sensitivity is obtained, for instance, by using video cameras along with specialized magnetic particle and eddy current inspection methods. Accordingly, the laser workhead of the present invention could be retrofitted to an existing NDE system, or vice versa. An exemplary NDE system is described in U.S. Pat. No. 5,189,915, SINGLE MODE ULTRASONIC INSPECTION METHOD AND APPARATUS, assigned to Reinhart & Associates, Inc., in Austin Texas, which is hereby incorporated by reference. Other exemplary systems are provided by the assignee and are described at their website at <reinhartassoc.com>.

In the exemplary embodiment shown, cleaning system 30 is mounted to a side portion of lower housing 14. However, it should be recognized that cleaning system 14 could be mounted anywhere relative to turbine system 10, (e.g., on the shaft, on the turbine rotor assembly itself, on the turbine deck, on a separate standalone device, etc.). Furthermore, the blades could be cleaned with a portable handheld unit, as opposed to robotics. After a set of blades is cleaned, the turbine rotor assembly can be rotated into position for a next set of blades, and so on, until all of the blades have been cleaned. The robotics necessary to carry out the cleaning operation could be implemented in any manner, and any such variations are believed to fall within the scope of the present invention. For example, the cleaning system 30 could be adapted to clean multiple blades and/or clean both sides of the blade during one pass. Furthermore, the cleaning system 30 could be adapted to clean the dovetail section 20, as well the outer ring 21.

Figure 3:
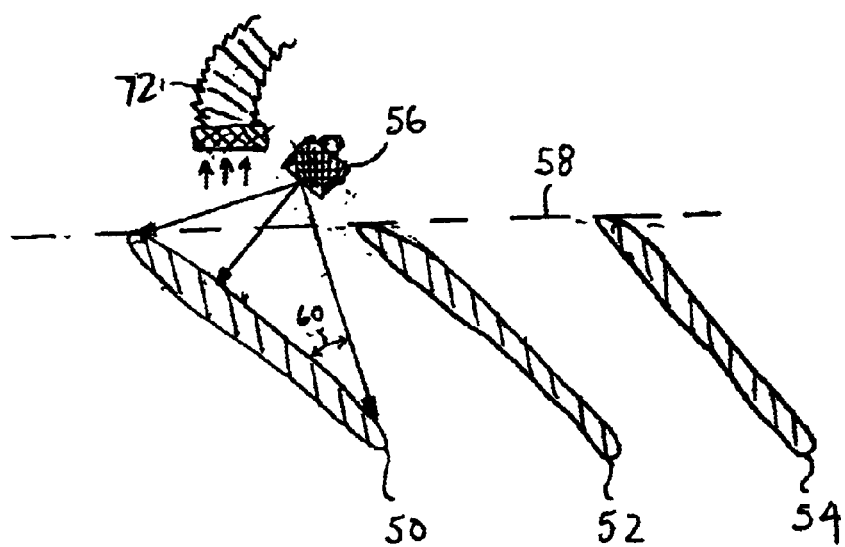
Figure 4:
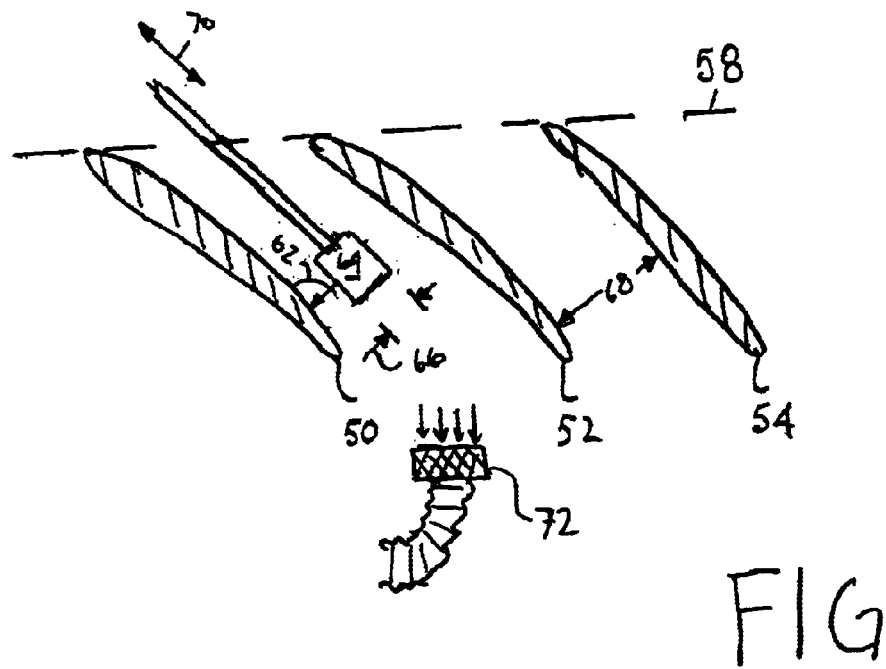

Referring now to FIGS. 3 and 4, a cutaway view looking down into a set of turbine blades 50, 52, 54 is shown. As can be seen, the blades are pitched such that they will be driven in a leftward or rightward direction when a fluid flow is passed therethough. The blade pitch may create an overlap among the blades, which adds complexity to the laser ablation operation. In the embodiment of FIG. 3, a laser workhead 56 is shown that operates externally (shown by dashed line 58) to the turbine rotor assembly. This embodiment assumes a "line of sight" application in which the entire surface can be cleaned from an externally positioned laser source. This embodiment may also be useful when the spacing between blades makes it impractical to insert a workhead between the blades. Located proximate laser workhead 56 is a vacuum system 72 for removing loose debris. In this embodiment, the laser workhead 56 does not need to enter into the spacing between the blades. Instead, the laser workhead can be angled so that the laser beam can reach the entire blade 50.

However, as the attack angle 60 becomes smaller, the efficacy of the laser ablation decreases. To compensate, the present invention will cause the laser system to either increase power or increase the ablation time in an amount proportional to attack angle 60. For instance, in a relatively straight ablation (i.e., attack angle 52 is 90 degrees +/– some predetermined variance), the present invention proposes a strip rate of a square foot per minute per kilowatt for a 1–2 mil ablation. As the attack angle 60 decreases, the strip rate would decrease proportionally to ensure adequate stripping.

FIG. 4 depicts a second embodiment for cleaning overlapping blades 50, 52, 54. In this case, laser workhead 64 is manipulated along arrow 70 into the spacing within the blades. To achieve this, the laser workhead 64 is designed to have a depth dimension 66 that is less than a minimal blade opening 68. Thus, a relatively perpendicular attack angle 62 can be maintained during the cleaning process. Also shown in FIG. 4 is an alternative vacuum system 72 location. Namely, in this embodiment, the vacuum system 72 is located on the opposite side of the turbine rotor assembly.

Rotor Bore

Figure 5:
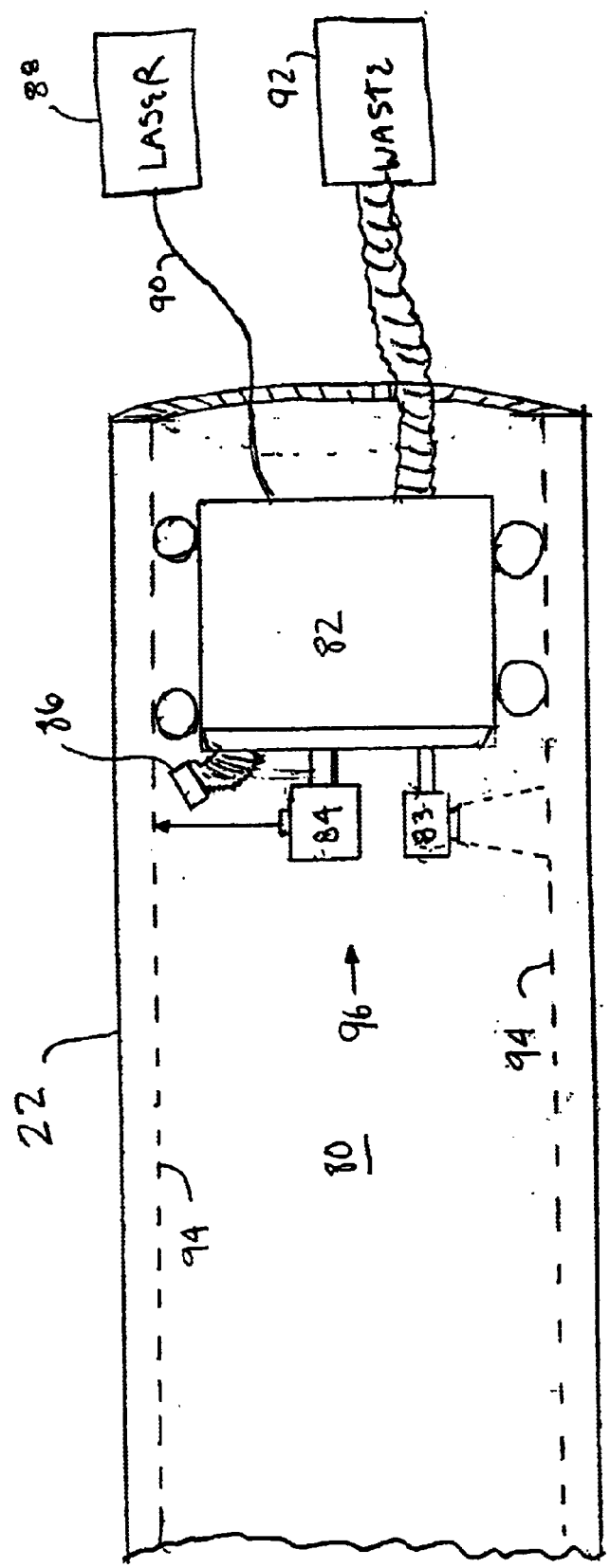

The interior of the shaft 22, referred to as the rotor bore 80 represents another important area of the turbine that requires regular cleaning, as the rotor bore is subject to regular non-destructive examinations. FIG. 5 depicts a cross-sectional view of the rotor bore 80 that includes a circular inner wall 94, which is cleaned with laser ablation by cleaning device 96. Cleaning device 96 comprises a robot 82 that traverses the inside of shaft 22 and transports a laser workhead 84 and vacuum system 86. Robot 86 comprises the necessary functionality to position laser workhead 84 throughout the bore 80, thereby allowing a continuous and uniform cleaning operation.

A laser 88 is positioned outside of the shaft 22, and communicates a laser signal through fiber optics 90. A waste collection system 92 is also positioned outside of the shaft 22 for the collection of debris captured by vacuum system 86. Any type of robot system capable of traversing a bore could be utilized. In addition, the cleaning device 96 may comprise an NDE system 83 that examines the surface after it is cleaned.

Generator Parts

In addition to the turbine parts described above, the concepts of the present invention could be applied to other components, including generator parts. For instance, the copper bars that make up the generator windings also require regular cleaning. A robotic device containing a portable laser workhead could be utilized in a similar fashion to laser ablate debris therefrom. Similarly, the stator core could be cleaned using the present system. An NDE system could also be incorporated to inspect the parts after they are cleaned.

Laser System

Figure 6:
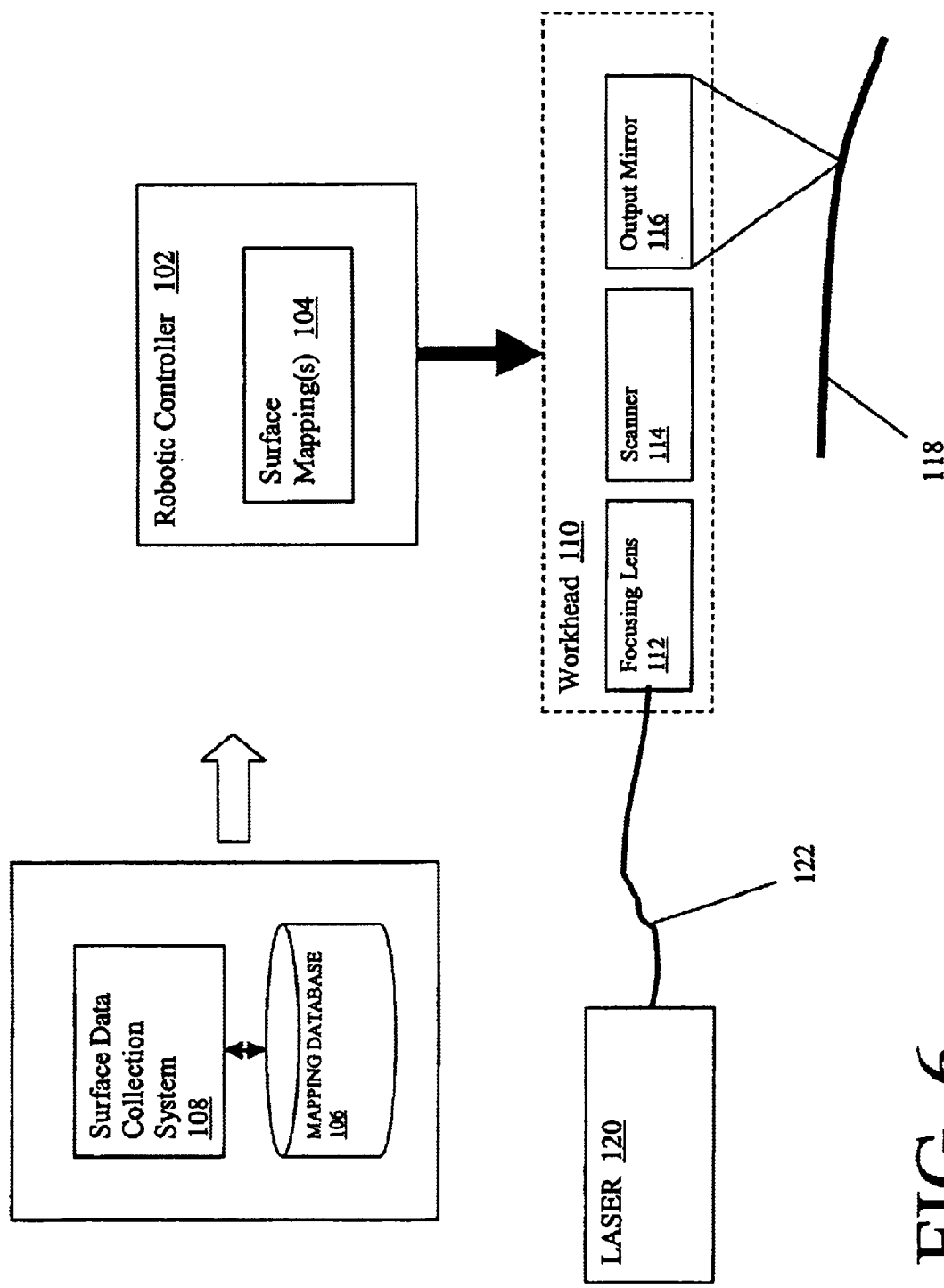

Referring now to FIG. 6, a laser system is shown, which generally comprises a laser 120 remotely connected to a laser workhead 110 via optical fibers 122. Workhead 110 is designed to laser ablate a predefined surface area on a work piece 118, e.g., a section comprising a one inch diameter circle. After a section is ablated, the process can be repeated on another section either by moving work piece 118 and/or workhead 110 until the entire work piece 118 has been cleaned.

Workhead 110 receives the laser signal from laser 120 and first passes the workhead through a focusing lens 112. Scanner 114 moves the beam to a new position for each pulse until a section is ablated. A typical system will generate pulses at a rate of 10–15 kHz. The beam may be moved in any pattern to ablate a section, e.g., a spiral, back and forth, etc. Output mirror 116 generates the focused beam onto the surface or work piece 118. A typical focused beam will be on the order 0.5 millimeters in diameter for a YAG laser, and as much as 0.5 inches for a $CO_2$ laser. As noted, after a section has been ablated, the workhead can be repositioned to a new section.

In order to achieve efficient ablation, the present invention proposes a power output of 1–2 kilowatts for laser 120. If necessary, several smaller lasers (e.g., two 600 watt lasers) could be utilized. Laser 120 is preferably an industrial laser capable of pulsed operation, e.g., a Q switched Nd:YAG ("YAG") or $CO_2$ laser. U.S. Pat. No. 6,288,362 B1 issued to Thomas et al. on Sep. 11, 2001, entitled METHOD AND APPARATUS FOR TREATING SURFACES AND ABLATING SURFACE MATERIAL, describes such as system, and is hereby incorporated by reference. As noted above, a proposed strip rate for a 1–2 mil thickness ablation is approximately one square foot per minute per kilowatt.

As shown in FIG. 6, workhead 110 may be positioned from section to section by a robotic controller 102. Robotic controller 102, for example, moves workhead 110 along a turbine blade to achieve an automated and uniform ablation. Robotic controller may include a surface mapping 104 of the turbine part being cleaned. Surface mapping 104 defines the position and contours of the work piece being cleaned. Surface mapping 104 may be obtained by a surface data collection system 108, and be stored in mapping database 106. For example, because there exists numerous turbine systems, many different blade configurations and styles exist. Accordingly, a mapping for each different model could be stored in mapping database 106, and then uploaded to robotic controller 102 as needed.

As an alternative, a portable handheld device comprising workhead 10 could be used to clean turbine parts.

The foregoing description of the preferred embodiments of the invention has been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

What is claimed is:

1. A laser-based cleaning system for cleaning blades of a turbine rotor assembly, comprising:
   a laser positioned remotely from the turbine rotor assembly for generating a laser signal;
   a laser workhead that receives the laser signal via an optical fiber, wherein the laser workhead is positionable proximate a blade in the turbine rotor assembly and can deliver a laser beam onto a surface of the blade to cause a cleaning of the blade, wherein the workhead is contained in a robot that automatically moves the workhead in a generally radial direction along the blade; and
   a vacuum system for vacuuming debris created by the cleaning, wherein the vacuum system is positioned on a side of the turbine rotor assembly opposite of the laser workhead.

2. The laser-based cleaning system of claim 1, wherein the laser is selected from the group consisting of a YAG laser and a $CO_2$ laser.

3. The laser-based cleaning system of claim 1, wherein the workhead is manipulated to account for surface contours according to a surface mapping.

4. The laser-based cleaning system of claim 1, wherein the workhead is manipulated in between blades of the turbine rotor assembly.

5. The laser-based cleaning system of claim 1, wherein the workhead has a depth dimension that is less than a minimum spacing between adjacent blades.

6. The laser-based cleaning system of claim 1, wherein the workhead is angularly repositioned to reach overlapped portions of the blade.

7. The laser-based cleaning system of claim 1, wherein the turbine rotor assembly is mounted in a lower housing.

8. The laser-based cleaning system of claim 7, wherein the robot is mounted onto a structure selected from the group consisting of the lower housing and the turbine deck.

9. The laser-based cleaning system of claim 1, wherein the laser workhead is contained within a handheld device.

10. The laser-based cleaning system of claim 1, wherein laser generates a laser beam of approximately 0.5–5 kilowatts.

11. The laser-based cleaning system of claim 1, wherein the laser ablates 1–2 mils of debris from the blade according to a strip rate given by one square foot per minute per kilowatt.

12. The laser-based cleaning system of claim 1, wherein the workhead can be positioned to clean a dovetail section of the turbine rotor assembly.

13. The laser-based cleaning system of claim 1, further comprising a non-destructive evaluation system integrated into the robot that examines each blade after it is cleaned.

14. A method for laser-based cleaning of blades in a turbine rotor assembly, comprising:
positioning a laser remotely from the turbine rotor assembly;
mounting a robot proximate the turbine rotor assembly;
providing within the robot a laser workhead that receives a laser signal from the laser via an optical fiber;
positioning the workhead proximate a first turbine blade such that the workhead can deliver a laser beam onto the surface of the first blade;
robotically moving the workhead along the first blade in a preprogrammed manner while the laser beam ablates the surface of first blade to effectuate a cleaning of the first blade; and
vacuuming debris caused by the ablation.

15. The method of claim 14, wherein the turbine rotor assembly is mounted in a lower housing.

16. The method of claim 15, wherein the robot is mounted onto a structure selected from the group consisting of the lower housing and a turbine deck.

17. The method of claim 14, comprising the further steps of:
rotating the turbine rotor assembly after a first set of turbine blades is cleaned;
positioning the workhead proximate a second set of turbine blades; and
effectuating a cleaning of the second set of turbine blades in the same manner as the first set of turbine blades.

18. The method of claim 14, wherein the laser beam is generated with a power of approximately 0.5–5 kilowatts.

19. The method of claim 14, wherein each blade is cleaned according to a strip rate in which each 1–2 mil thickness of debris is ablated at a rate of one square foot per minute per kilowatt.

20. The method of claim 14, wherein the step of vacuuming is done from a side of the turbine rotor assembly opposite of the workhead.

21. The method of claim 14, comprising the further step of using the robot to perform a non-destructive evaluation of each turbine blade.

22. A laser-based cleaning system for cleaning a rotor bore within a turbine shaft, comprising:
a laser positioned remotely from the turbine shaft for generating a laser signal;
a robot capable of traversing the rotor bore and directing a laser workhead at predetermined positions along the rotor bore surface;
an optical fiber that delivers a laser signal from the laser to the laser workhead, wherein the laser workhead can deliver a laser beam onto rotor bore surface to cause a cleaning; and
a vacuum system for vacuuming debris created by the cleaning.

23. The laser-based cleaning system of claim 22, wherein the laser comprises a power of approximately 0.5–5 kilowatts.

24. The laser-based cleaning system of claim 22, wherein the rotor bore is cleaned according to a strip rate in which each 1–2 mil thickness of debris is ablated at a rate of one square foot per minute per kilowatt.

25. The laser-based cleaning system of claim 22, wherein the robot includes a non-destructive evaluation system for examining the rotor bore during the cleaning operation.

26. A laser-based cleaning system for cleaning power generation components, comprising:
a laser workhead that receives the laser signal via an optical fiber, wherein the laser workhead is positionable proximate a component and can deliver a laser beam onto a surface the component to cause a cleaning, at least one of the laser power and ablation time being adjustable in proportion to an attack angle of the laser workhead;
a laser positioned remotely from the laser workhead for generating a laser signal over the optical fiber; and
a vacuum system for vacuuming debris created by the cleaning.

27. The laser-based cleaning system of claim 26, wherein the component is cleaned according to a strip rate in which each 1–2 mil thickness of debris is ablated at a rate of one square foot per minute per kilowatt.

28. The laser-based cleaning system of claim 27, wherein the laser is selected from the group consisting of a YAG laser and a $CO_2$ laser.

29. The laser-based cleaning system of claim 27, wherein the laser comprises a power of approximately 0.5–5 kilowatts.

30. The laser-based cleaning system of claim 26, wherein the workhead comprises a focusing lens, a scanner, and an output mirror.

31. The laser-based cleaning system of claim 26, wherein the workhead is positioned by a robotic controller that includes a surface mapping of the component.

32. The laser-based cleaning system of claim 26, wherein the robotic controller further positions a non-destructive evaluation system for examining the component after the cleaning operation.

33. The laser-based cleaning system of claim 26, wherein the power generation components are selected from the group consisting of turbine parts and generator parts.

* * * * *